April 28, 1931.  W. E. PHILLIPS  1,802,572
COUPLING
Filed Oct. 1, 1928
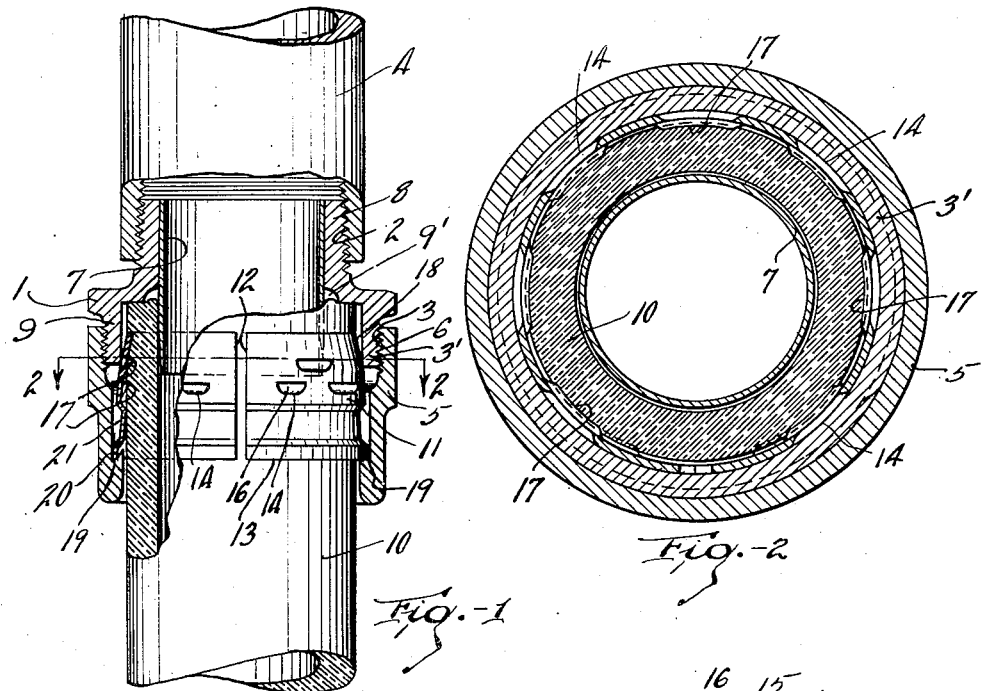
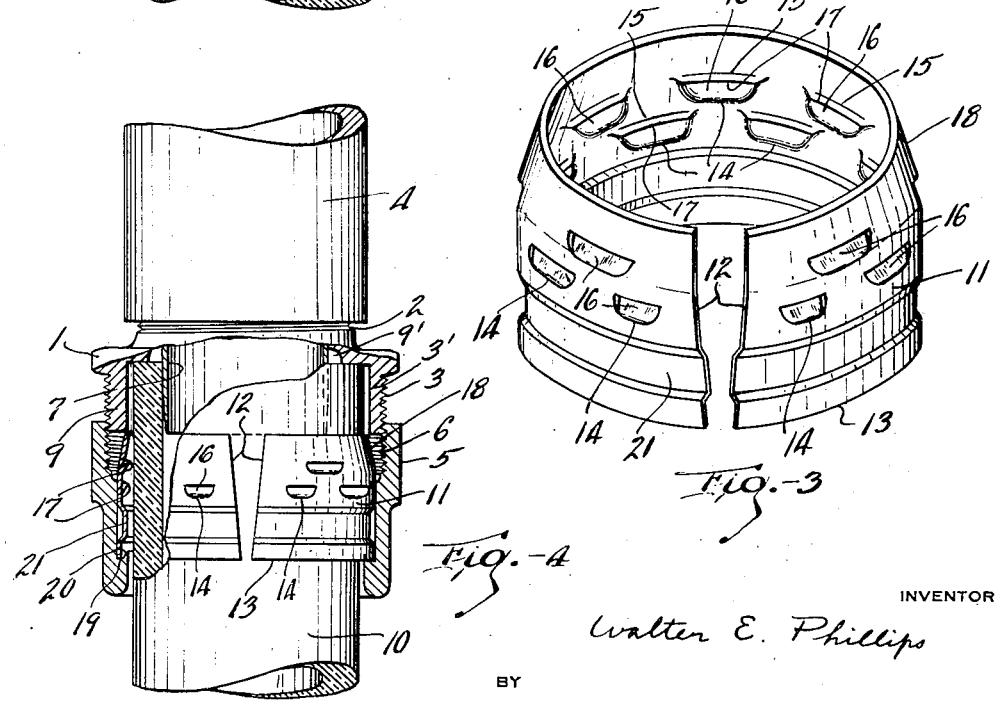
INVENTOR
Walter E. Phillips
BY
Arthur H. Van Horn
HIS ATTORNEY Patented Apr. 28, 1931

1,802,572

UNITED STATES PATENT OFFICE

WALTER E. PHILLIPS, OF CLEVELAND HEIGHTS, OHIO

COUPLING

Application filed October 1, 1928. Serial No. 309,474.

My invention is an improvement in couplings for conduits.

One of the objects of my invention is to firmly grip a conduit within a coupling without deforming the conduit walls but at the same time preventing relative movement between the conduit and the coupling members when assembled.

Another object of my invention is to construct a simple, inexpensive means for coupling conduits, one of which being formed of flexible material, said means retaining the conduits rigidly in coupled relation.

Another object of my invention is to prolong the life of flexible conduits at points adjacent a coupling with another conduit, and at which points the flexible conduit is subjected to almost constant and excessive strains, as when the flexible conduit is constantly under strain of angular adjustment.

Other objects and advantages of my invention will become more apparent from the following description of an embodiment thereof, reference being made to the accompanying drawings in which like reference characters are employed to designate like parts throughout the same.

Figure 1 is an elevation partly in section, showing my invention in use,

Figure 2 is a section on line 2—2 of Figure 1,

Figure 3 is an enlarged perspective view of the clamping ring, and,

Figure 4 is a view similar to that of Figure 1 showing the positions of the parts when the coupling members are partly unscrewed.

In the drawings, which illustrate one embodiment of my invention, a male coupling member 1 is provided with external threads 2 and 3. This coupling member may be coupled to the end of a pipe 4 by means of the threads 2, while a female coupling member 5 is internally threaded at 6 to receive threads 3 of the male member 1. A connecting tube or sleeve 7 is securely held within the reduced portion 8 of the male member 1. In the present embodiment the tube is pressed into the portion 8, one end of the tube extending into the enlarged portion of the male member to receive the end of the flexible conduit.

I have provided means whereby the end of a flexible conduit 10 may be clamped securely within the assembled coupling members in such a manner that the bore of the conduit will not be distorted or deformed and the conduit will be held against axial or circumferential movement with respect to the coupling members. The flexible conduit illustrated is preferably of the re-enforced type, having one or more spirally arranged metallic members embedded therein.

The above mentioned means includes a clamp, of which I have illustrated one embodiment in Figure 3 of the drawings. The illustrated clamping member consists preferably of a split metallic ringlike structure 11, the walls defining the split converging toward the lower edge of the clamp at 13. The clamp is formed of sheet metal having an inherent resiliency which normally expands the ring and separates the walls 12 as shown in Figure 3. The clamp is provided with means for gripping the flexible conduit about which it is placed, which consists of one or more series of serrations 14 annularly arranged and formed in the clamp material by slitting the material at spaced intervals as at 15, and then pressing the material adjacent the slits inwardly as at 16. In this manner, annular series of edged serrations 14 are provided to engage and bite into the material of the flexible conduit upon contraction of the clamp.

In the drawings, I have shown two substantially parallel annular series of serrations, the serrations of one series alternating with those of the other series. It is to be understood that only one series of serrations may be employed or, if desired, a number of such series may be used. It is also to be understood that my invention contemplates not only the specific form of serrations illustrated but they may take other forms as, for example, the form of inwardly projecting cones.

The upper annular wall of the clamp is tapered inwardly as at 18, and is engaged by the wall 9 of the male member 1 to close the clamp about the flexible conduit when the coupling members are screwed together. When the clamp is assembled within the coupling member 5 its lower peripheral edge 13 rests in the angular groove 19 formed in the lower wall of the member 5, which supports the clamp and prevents displacement thereof from the member 5. It will be noted that the wall 20 of the groove forms an angle of about 60° with the other wall of the groove, providing means for guiding the lower edge 13 of the clamp into the groove and preventing unseating of this edge when the clamp is contracted.

I have provided means intermediate the serrations and the lower edge 13 of the clamp for gripping the flexible conduit 10 and preventing the walls of the slit near the edge 13 from overlapping. In the embodiment illustrated this means includes a continuous annular flat portion 21 pressed inwardly of the ring to engage the flexible conduit and firmly grip the same, when the clamp is contracted, without deforming the walls of the conduit. It will be noted that this flat portion contacts with the flexible conduit over an enlarged area annularly which is sufficient to firmly grip and hold the conduit against relative circumferential movement and to supplement the gripping action of the serrations 14. Although I have illustrated the flat portion 21 as a continuous annular depression, other forms may be employed and I wish it to be understood that my invention contemplates such other forms, as for instance, the intermediate gripping means may include an annular series of closely spaced depressed flat portions, or I may provide an internal ring secured to the inner wall of the clamp between the serrations and the edge 13.

In use my invention operates as follows:

Assuming that the parts illustrated are all disassembled and it is desired to assemble them as shown, the male member 1 is first screwed upon the end of the conduit 4. The free end of the flexible conduit 10 is then passed through the normally expanded clamping ring 11 which is assembled within the female member 5 and seated in the groove 19. The end of the flexible conduit is passed over the pressed sleeve 7 as indicated until it abuts the upper wall of the male member 1. Before the female member is screwed on to the male member, the ring, owing to its inherent resiliency, is normally expanded as shown in Figure 3, but as the coupling members are screwed together, the inner wall of the threaded portion 3' of the male member engages and rides down the inclined wall 18 of the clamping ring to contract the same. As the ring is thus contracted or closed about the flexible conduit, the edges 17 of the serrations 14 bite into the conduit material and securely grip the same and some of the conduit material and the jagged edges of the re-enforcing element embedded in the conduit walls are pressed into the recess 9'. An effective seal is thus provided between the conduit and the coupling members. It will be noted that the serrations are struck upwardly, that is, their sharp conduit engaging edges extend upwardly and inwardly of the clamping ring. In this manner the serrations aid in preventing relative axial movement between the coupling members and the flexible conduit since the free edge of the conduit is in abutment with the upper inner wall of the male member. As the ring is contracted by screwing the coupling members together, the annular flat portion 21 of the ring also firmly grips the flexible conduit and further assists in preventing relative movement between the conduit and the coupling members. The angularly disposed walls of the annular groove guide or assist the seating of the lower peripheral edge 13 of the clamping ring in the groove and support this ring in the female member against displacement. As the clamp is contracted about the conduit the walls 12 defining the split are prevented from overlapping at their lower extremities because of the re-enforcement of the flat portion 21 and the tendency of the walls of the groove to retain the edge 13 of the clamp in its seat.

It will be noted that the walls 12 normally converge toward the edge 13 of the clamp, but as the clamp is contracted by bringing the coupling members together, these walls assume a substantially parallel relation to each other. As the clamp is contracted or closed about the conduit 10 the serrations bite into the conduit material thus permitting a greater contraction of the upper portions of the clamp than the lower portion which includes the flat portion 21. The flat portion does not bite into or deform the conduit material but firmly grips the same and stiffens the lower portion of the clamp, thus limiting the degree to which this portion of the clamp may be contracted when the coupling members are brought together to their limit of adjustment.

When it is desired to disassemble the parts, the female coupling member is unscrewed, and the conduit removed from the sleeve 7 and the male member. The female member may then be slipped back a sufficient distance on the conduit to expose the clamping ring, which, due to its inherent resiliency, will expand releasing the serrations and flat portion 21 from the conduit. The ring and female member may then be removed over the end of the conduit.

Various changes may be made in the details of construction and arrangement of parts without departing from the spirit of the invention or the scope of the appended claims.

What I claim is:

1. In a coupling for conduits, co-operating coupling members, a flexible conduit in one of said members, and a contractible clamping ring between one of the coupling members and the conduit, said one coupling member having a shoulder and a clamp retaining seat formed in said shoulder, said clamp being contracted to grip the conduit securely when the coupling members are brought together in closed position.

2. In a coupling for conduits, cooperating coupling members, a conduit in one of said members, a tube extending from the other of said members and into the first member to receive thereon the end of said conduit, and a contractible sheet metal clamping ring interposed between the conduit and said first member and having its upper conduit engaging wall inclined toward said conduit, said ring being seated and retained in a groove formed in one of said coupling members, the walls of the groove converging to prevent collapsing of the portion of the ring seated in the groove, said sheet metal ring having a portion thereof depressed inwardly and out of the plane of the main body portion of the ring to tightly grip said conduit, when the coupling members are assembled together.

3. In a coupling for conduits, cooperating coupling members, a conduit in one of said members, and a contractible sheet metal clamping ring interposed between the conduit and said first member and having its upper annular wall inclined toward said conduit, said ring being seated and retained in a groove formed in one of said coupling members, the walls of the groove converging to prevent displacement of the ring seated in the groove when the coupling members are assembled.

In testimony whereof I hereunto affix my signature this 10th day of September, 1928.

WALTER E. PHILLIPS.